(12) United States Patent
Abhishek et al.

(10) Patent No.: US 10,579,896 B2
(45) Date of Patent: Mar. 3, 2020

(54) MARK DETECTION SYSTEM AND METHOD

(71) Applicant: Newgen Software Technologies Limited, Siruseri, Chennai (IN)

(72) Inventors: Jindal Abhishek, Haryana (IN); Lal Puja, Chennai (IN)

(73) Assignee: NEWGEN SOFTWARE TECHNOLOGIES LIMITED, Chennai (IN)

( * ) Notice: Subject to any disclaimer, the term of this patent is extended or adjusted under 35 U.S.C. 154(b) by 89 days.

(21) Appl. No.: 15/869,142

(22) Filed: Jan. 12, 2018

(65) Prior Publication Data

US 2019/0164003 A1 May 30, 2019

(30) Foreign Application Priority Data

Nov. 28, 2017 (IN) .............................. 201741042550

(51) Int. Cl.
*G06K 9/46* (2006.01)
*G06K 9/00* (2006.01)
*G06T 7/00* (2017.01)
*G06K 9/38* (2006.01)

(52) U.S. Cl.
CPC ....... *G06K 9/4604* (2013.01); *G06K 9/00442* (2013.01); *G06K 9/00449* (2013.01); *G06K 9/38* (2013.01); *G06T 7/0002* (2013.01); *G06K 2209/01* (2013.01); *G06T 2207/30204* (2013.01)

(58) Field of Classification Search
CPC ......................... G06K 2209/01; G06K 9/2063
See application file for complete search history.

(56) References Cited

U.S. PATENT DOCUMENTS

| 2006/0291727 | A1* | 12/2006 | Bargeron | ........... | G06K 9/00442 |
| | | | | | 382/218 |
| 2009/0196508 | A1* | 8/2009 | Sullender | ............. | G06K 9/4638 |
| | | | | | 382/201 |
| 2011/0200256 | A1* | 8/2011 | Saubat | ................. | G06K 9/2063 |
| | | | | | 382/195 |

* cited by examiner

*Primary Examiner* — Ross Varndell
(74) *Attorney, Agent, or Firm* — Harness, Dickey & Pierce, P.L.C.

(57) ABSTRACT

A mark detection system and method is provided. The system includes a memory having computer-readable instructions stored therein. The system further includes an image processor configured to execute the computer-readable instructions to access an image of a document and process the image to generate a binarized image. The image processor is further configured to extract components of the binarized image using a connected-component labelling algorithm. Furthermore, the image processor is configured to analyze features of the extracted components to detect one or more marks in the document.

17 Claims, 5 Drawing Sheets

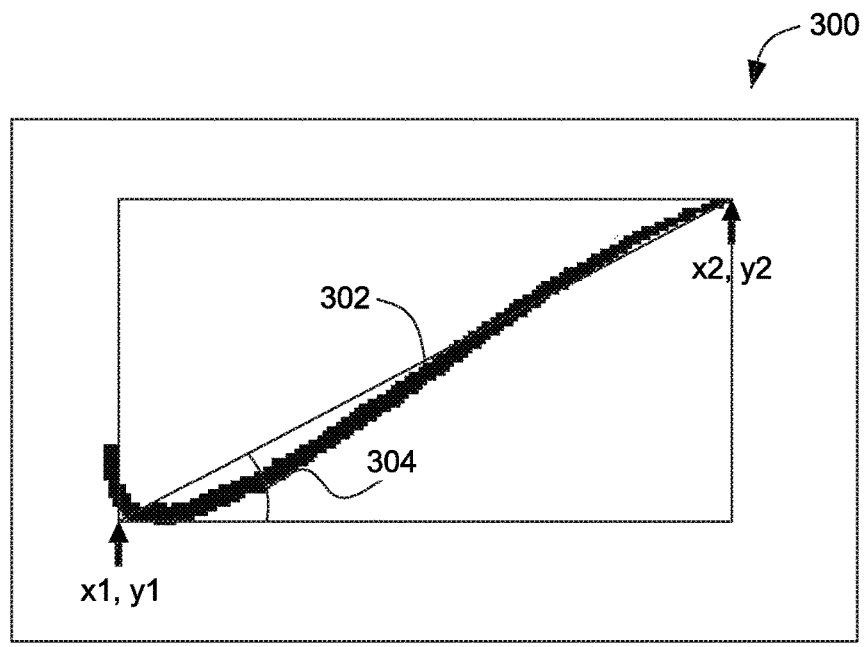
FIG. 3-A
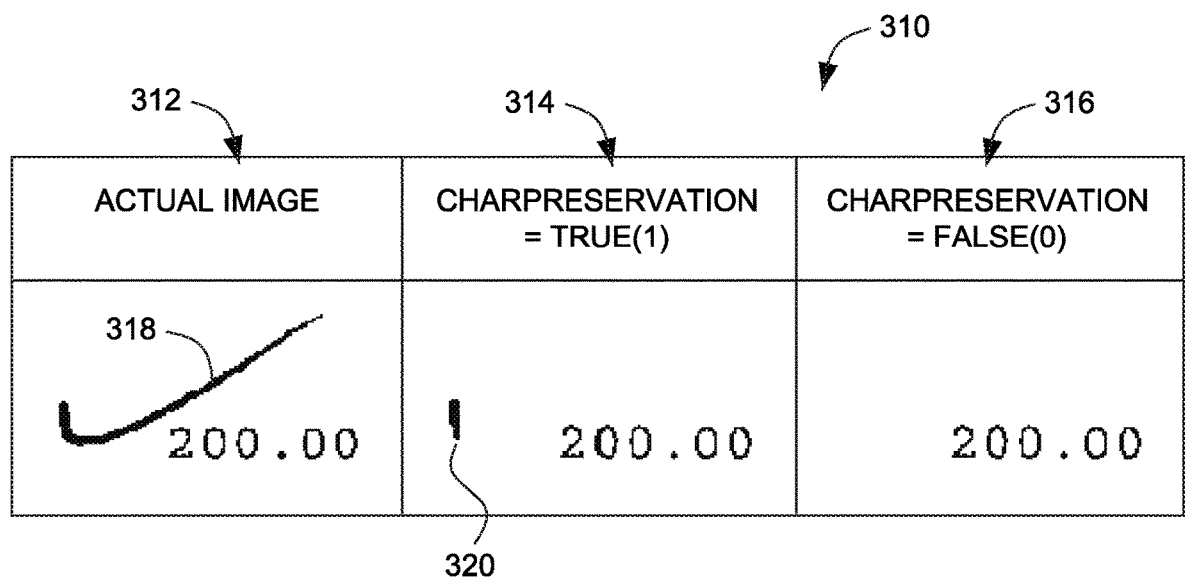
FIG. 3-B

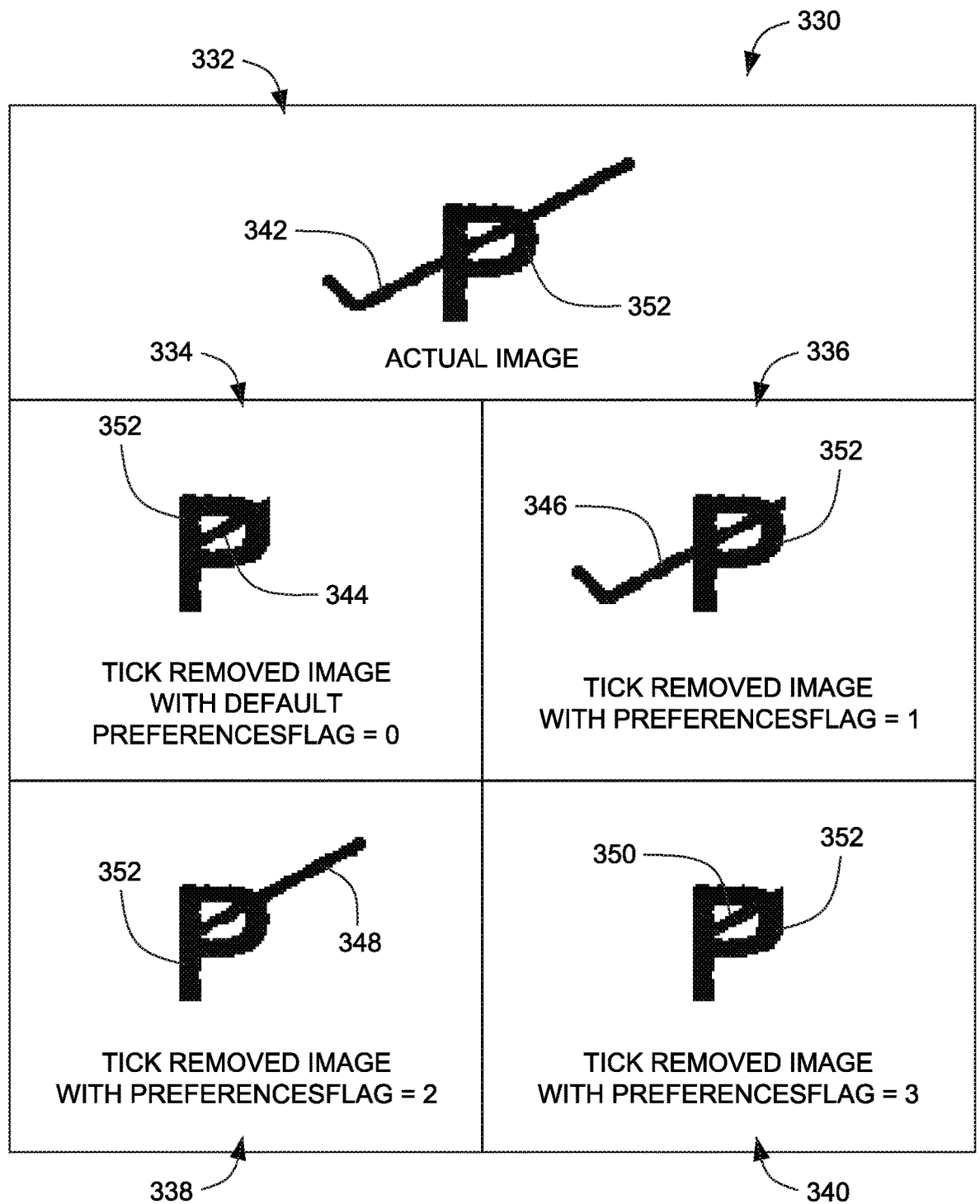
FIG. 3-C

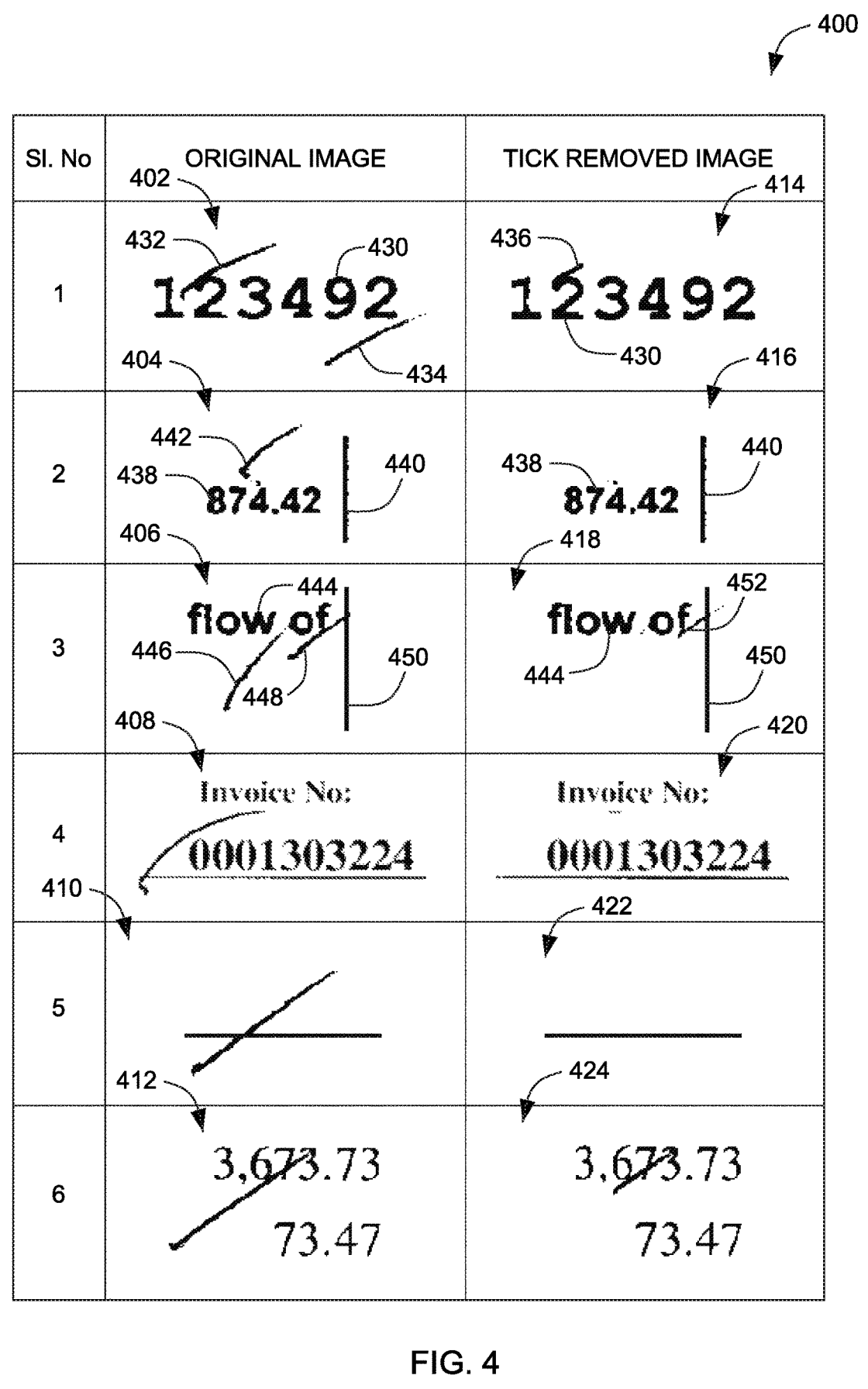

| Sl. No | ORIGINAL IMAGE | TICK REMOVED IMAGE |
|---|---|---|
| 1 | 123492 | 123492 |
| 2 | 874.42 | 874.42 |
| 3 | flow of | flow of |
| 4 | Invoice No: 0001303224 | Invoice No: 0001303224 |
| 5 | | |
| 6 | 3,673.73  73.47 | 3,673.73  73.47 |

FIG. 4

MARK DETECTION SYSTEM AND METHOD

PRIORITY STATEMENT

The present application hereby claims priority under 35 U.S.C. § 119 to Indian patent application number 201741042550 filed 28 Nov. 2017, the entire contents of which are hereby incorporated herein by reference.

FIELD

Embodiments of the invention relate generally to image processing systems and more particularly to a mark detection system and method for detecting and removing marks in a document image.

BACKGROUND

Even as the organisations across the world are moving more rapidly towards electronic transactions, areas like financial services, insurance companies, government agencies continue to deal with enormous amounts of paper-based transactions. Some of these enterprise use paper-based forms like applications, invoices, examination papers and other documents as a medium for capturing data. The data captured is submitted for electronic processing and the content is fed into a business system. Information on such documents may be handwritten, machine printed, or a combination of both and can be captured and further passed into the system for data extraction.

Data extraction may be done either manually or through electronic processing. Manual data entry involves human involvement and thus it may be time consuming and can be error prone. Alternatively, electronic processing reduces the cost while improving processing speed and accuracy. In recent years, organizations have been increasingly relying on automatic recognition technology to capture the information from paper documents. Various technologies such as Optical Character Recognition/Intelligent Character Recognition and pattern recognition are applied to document images to capture and process the data from such images.

Currently, automatic data recognition technology aims at automatically identifying and capturing the document data and to feed appropriate image data to a data extraction engine. Such recognition technology may identify content of the documents such as presence of characters, patterns, and the like. More recently, intelligent document recognition techniques such as automatic form recognition have been developed. Such techniques are used to identify both hand written as well as machine entered content. However, more intelligence needs to be added to such solutions while dealing with hand written data. In some cases, certain hand-written marks which are not a part of actual content need to be identified and removed for more efficient data extraction.

For example, in some cases, the data in the documents used in a business flow are validated by a user or an examiner by applying correction marks such as tick marks and/or cross marks on the document images. Presence of such user entered marks poses a big challenge in automatic extraction of data from the document images. This sometimes may lead to incorrect decoding resulting in extraction of unwanted data from the document images. For document processing systems, such as invoice processing, pattern recognition for the line item data extraction is very significant. Due to the presence of user entered marks on the line items, blocks may be identified incorrectly which reduces the pattern recognition accuracy.

Thus, there is a need to effectively process document images and remove unwanted data and marks from the images to enable accurate data extraction.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide a mark detection system.

Briefly, according to an example embodiment, a mark detection system is provided. The system includes a memory having computer-readable instructions stored therein. The system further includes an image processor configured to execute the computer-readable instructions to access an image of a document and process the image to generate a binarized image. The image processor is further configured to extract components of the binarized image. Furthermore, the image processor is configured to analyze features of the extracted components to detect one or more marks in the document.

According to another example embodiment, a method for removing marks in a document is provided. The method comprises accessing an image of the document and processing the image to generate a binarized image of the document. The method further comprises extracting components of the binarized image using a connected-component labelling algorithm and analyzing features of the extracted components to detect one or more marks in the document. In addition, the method comprises selectively removing the detected one or more marks in the document.

According to yet another example embodiment, a mark detection system is provided. The system includes a memory having computer-readable instructions stored therein. The system further includes an image processor configured to execute the computer-readable instructions to access an image of a document and process the image to generate a binarized image. The image processor is further configured to extract components of the binarized image using a connected-component labelling algorithm. In addition, the image processor is configured to analyze features of the extracted components to detect one or more marks in the document. Furthermore, the image processor is configured to remove portions of the one or more detected marks from the document.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIGS. 3-A through 3-C illustrate detection and removal of marks from images of documents using the system of FIG. 1, according to the aspects of the present technique;

FIG. 4 illustrates example screenshots of actual images and mark removed images, according to the aspects of the present technique.

DETAILED DESCRIPTION OF EXAMPLE EMBODIMENTS

Figure 1:
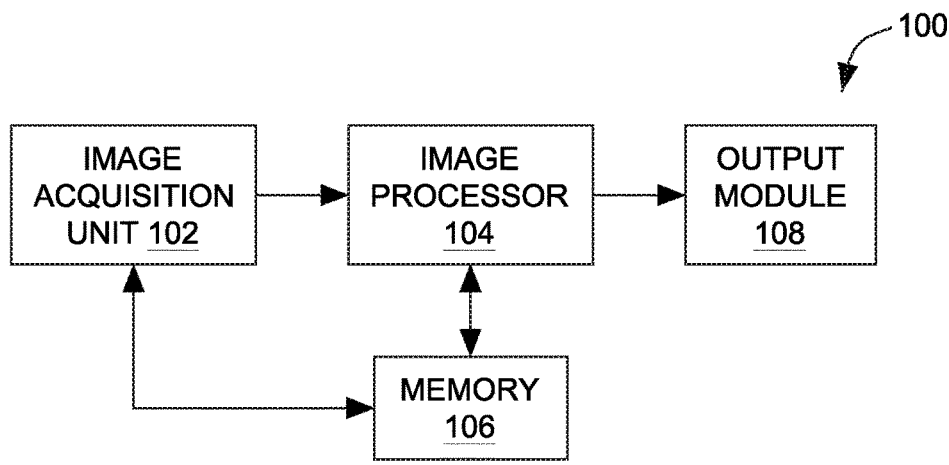
FIG. 1 is a block diagram illustrating a mark detection system, according to the aspects of the present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like manner (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

At least one example embodiment is generally directed to a mark detection system and method for detecting one or more marks from the document images and removing such marks for better and effective image extraction.

FIG. 1 is a block diagram illustrating a mark detection system 100 configured to detect and remove the marks from an image of a document. The mark detection system 100 includes an image acquisition unit 102, an image processor 104, a memory 106, and an output module 108. Each component is described in further detail below.

The image acquisition unit 102 is configured to acquire an image of a document. In an embodiment, the image acquisition unit 102 may include a digital camera, an image scanner, a mobile phone, or combinations thereof. In one example, the captured/scanned image may be image of an application form, an administrative document, a financial document, an invoice, an examination document, and the like.

The image processor 104 is configured to access the image of the document from the image acquisition unit 102. The captured/scanned image may be an image of an application form, an administrative document, a financial document, an invoice, an examination document and the like. Further, the image processor 104 is configured to process the acquired image to generate a binarized image. As used herein, the term "binarized image" refers to a digital image having only two possible values for each pixel of the image. The image processor 104 is configured to remove noise components in the binarized image and to generate a clean image of the document. In an example embodiment, the noise components may be removed using connected component labelling algorithm. In addition, one or more horizontal and/or vertical lines present in the binarized image are removed to obtain a clean binarized image. In one embodiment, a skew angle of the clean binarized image is detected for further processing.

The image processor 104 is further configured to extract components of the binarized image using a connected-component labelling algorithm. However, other suitable extraction techniques may be used. In an embodiment, the components may be extracted using an eight-neighbour connected-component labelling algorithm. In operation, the connected-component labelling algorithm may scan an image pixel by pixel (from top to bottom and left to right) and groups its pixels into components based on pixel connectivity to identify connected pixel regions. In an embodiment, the regions of the connected pixels share same set of intensity values. Each pixel is labelled according to the component it has been assigned to, once all the groups have been determined.

In a further embodiment, the image processor 104 is configured to analyze features of the extracted components to detect one or more marks in the document. In an embodiment, the one or more marks may include tick marks, cross marks, or combinations thereof. Moreover, the features of the extracted components may include length, stroke width, angle with respect to a pre-determined axis, or combinations thereof. In this embodiment, one or more features of the extracted components are adjusted based on the detected skew angle.

Moreover, the image processor 104, is configured to selectively remove one or more marks based upon the features of the extracted components. In one example, the image processor 104 is configured to detect a portion of a component connected to the one or more detected marks. In another embodiment, a portion of a component overlapping with the one or more detected marks is determined/detected. Further, the image processor 104 is configured to remove the portion of a component connected to the detected one or more marks. The image processor 104 may remove portions of the components, or the marks based upon pre-determined variables. For example, the image processor 104 may remove a portion of the component based on a value of a preservation variable. In another embodiment, portions of the one or more detected marks are selectively removed based on a value of a preference variable. It should be noted that the values of each of the preservation and the preference variable may be selected by a user of the system 100.

The memory 106 is configured to store the one or more images of the document received from image acquisition unit 102. Such images may be captured by a digital camera, an image scanner, a mobile phone, or combinations thereof. In an embodiment, the memory 106 is configured to store the binarized image generated by the image processor 104. In addition, memory may be used to store a plurality of features associated with the extracted components of the binarized image. Moreover, the memory 106 may be configured to store values of user-defined features such as the preservation and the preference variables.

The output module 108 is configured to display the processed image generated by the mark detection system 100. In an embodiment, the processed image includes the actual contents of the image where any unwanted marks like tick marks and cross marks are removed. The processed image generated may be further used for pattern recognition and data extraction. As will be appreciated by one skilled in the art, the processed clean image generated by the system 100 may be utilized for accurate pattern recognition and effective data extraction. The computer readable instructions executed by the image processor 104 are used to carry out the functionalities of each of the above-identified modules.

Figure 2:
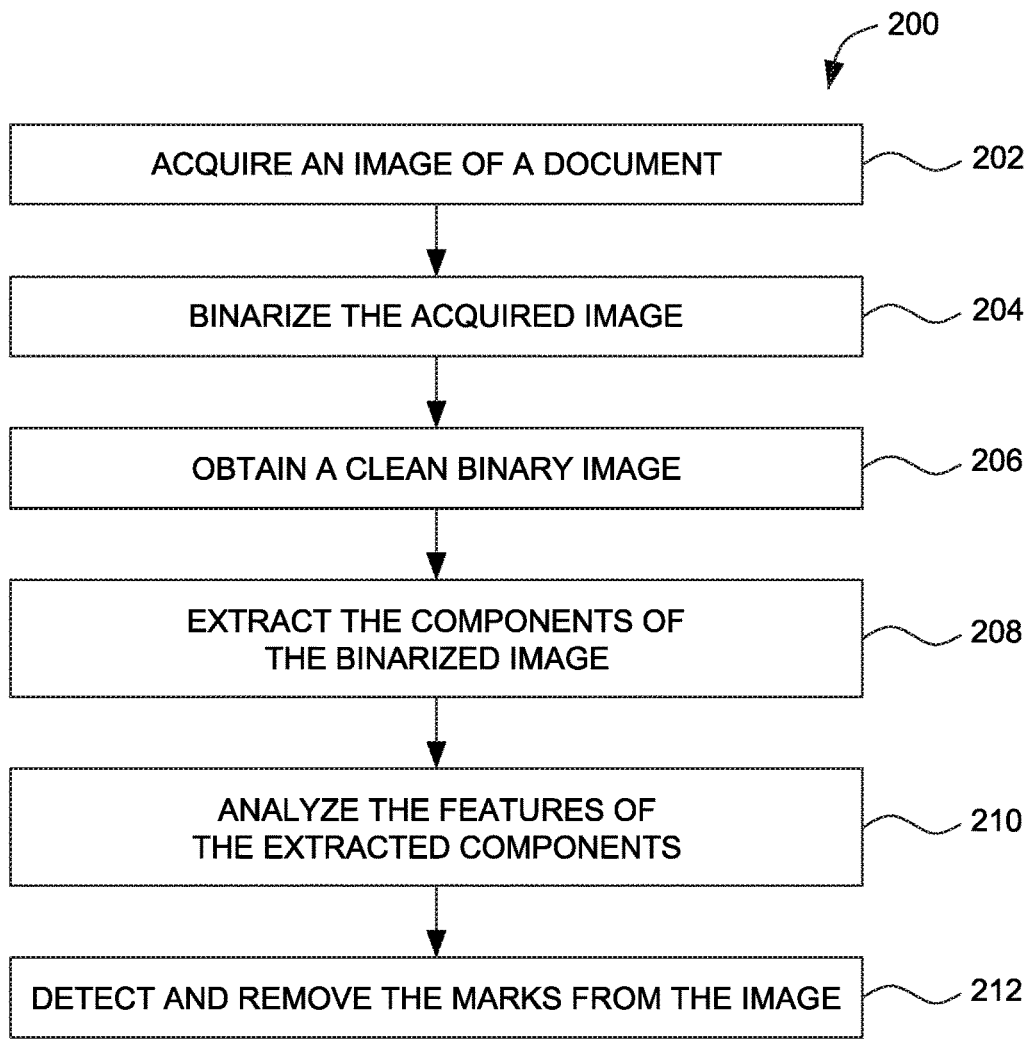
FIG. 2 is a flow diagram illustrating a process for detecting and removing marks in the document images using the mark detection system of FIG. 1.

FIG. 2 is an example process 200 for detecting and removing marks in the document images using the mark detection system 100 of FIG. 1, according to the aspects of the present technique.

At step 202, an image of a document is acquired. In an embodiment, the image may be captured using a digital camera, an image scanner, a mobile phone, or combinations thereof. The captured/scanned image may be an image of an application form, an administrative document, a financial document, an invoice, an examination document, and the like. At step 204, the acquired image is processed to generate a binarized image. The binarized image is a digital image having only two possible values for each pixel.

At step 206, a clean image is obtained by removing the noise components in the binarized image. In an example embodiment, the noise components may be removed using a connected-component labelling algorithm. In addition, one or more horizontal and/or vertical lines present in the binarized image are removed to obtain the clean image. In one embodiment, the skew angle of the clean binarized image is detected for further processing.

At step 208, the components of the binarized image are extracted. In an embodiment, the components may be extracted using an eight-neighbour connected-component labelling algorithm. The connected-component labelling algorithm scans the image pixel by pixel (from top to bottom and left to right) and groups its pixels into components based on pixel connectivity to identify connected pixel regions. In an embodiment, the regions of the connected pixels share same set of intensity values. Each pixel is labelled according to the component it has been assigned to, once all the groups have been determined.

At step 210, features of the extracted components are analysed to detect one or more marks in the document. In an embodiment, the marks may include tick marks, cross marks, or combinations thereof. Further, the features of the extracted components may include length, stroke width, angle with respect to a pre-determined axis, or combinations thereof. In one embodiment, one or more features of the extracted components are adjusted based on the detected skew angle.

At step 212, one or more marks are detected and removed from the image. In an embodiment, portion of a component connected to the one or more detected marks is determined. In another embodiment, a portion of a component overlapping with the one or more detected marks is determined/detected. Further, the portion of a component connected to the detected one or more marks is removed. The portion of the component removed is based on a value of a preservation variable. In another embodiment, portions of the one or more detected marks are selectively removed based on a value of a preference variable.

As described above, the features of the extracted components from the image of the document are analysed to detect and remove one or more marks in the document. The manner in which it is achieved is described in further detail below.

FIGS. 3-A through 3-C illustrate detection and removal of marks from images of documents using the system 100 of FIG. 1, according to the aspects of the present technique.

FIG. 3-A illustrates an example 300 showing features associated with a tick mark utilized for detection of the mark in an image, according to the aspects of the present technique. In the illustrated embodiment, a tick length as represented by reference numeral 302, and a tick angle as represented by reference numeral 304 are estimated using (x1, y1) and (x2, y2) coordinates corresponding to start and end points of the tick mark. In one embodiment, a variable MinTickLength is used to represent a minimum tick length (measured in inches). In some examples, the value of MinTickLength is set to about 0.075 inches. In another embodiment, a variable MaxTickStripHeight is used to represent a maximum tick strip height (measured in inches) and depicts the maximum stroke width of a tick, i.e. the difference of lower and upper y-coordinates for a single x-coordinate. In some examples, the value of MaxTickStripHeight is set to about 0.05 inches.

In yet another embodiment, another variable MinTickAngle represents a minimum tick angle (measured in degrees) with respect to x-axis. In some examples, the value of the MinTickAngle is set to about 10.0 degrees. In addition, a float variable MaxTickAngle that represents a maximum tick angle (measured in degrees) with respect to. x-axis. In some examples, the value of MaxTickAngle is set to about 75.0 degrees.

FIG. 3-B illustrates examples 310 of removal of marks in an image 312 based on a CharPreservation variable using the system 100 of FIG. 1, implemented according to the aspects of the present technique. In an embodiment, CharPreservation variable is a Boolean variable that represents whether the component if attached to a tick mark is required to be preserved or not. As can be seen, the image 312 includes a tick mark 318 along with a numeral "200.00". The default settings for CharPreservation variable is set to FALSE (0). In this illustrated embodiment, in the image 314, a component 320 attached to the tick mark 318 seems to be similar to numeric "1". If the value of the CharPreservation variable is TRUE (1), then the component 320 attached to tick mark 318 is preserved as shown in image 314 else the component 320 is removed as can be seen in image 316 of FIG. 3-B.

FIG. 3-C illustrate various examples 330 of removal of marks in an image 332 based on a PreferenceFlag variable using the system 100 of FIG. 1, implemented according to the aspects of the present technique. In one embodiment, an actual image 332 having one or more marks is shown. The image 332 includes a component "P" (represented by reference numeral 352) with an overlapping tick mark 342. In one example, as illustrated in an image 334, parts of the tick mark on both the right side and the left side of the component "P" 352 are removed if the default variable value for PreferencesFlag variable is set to 0. In this embodiment, a part/section 344 of the tick mark attached and overlapping to the component 352 is retained.

Further, in another example, as illustrated in an image 336, a part of the tick mark on the right side of the component 352 is removed, if the value of PreferenceFlag variable is set to 1. In this embodiment, a part/section 346 of the tick mark overlapping and attached to the left side of the component 352 is retained.

In addition, as illustrated in an image 338, if the value of PreferenceFlag variable is set to 2, part of the tick mark on the left side of component 352 is removed and a part 348 of the tick mark overlapping and attached to the right side of the component 352 is retained. Further, in an image 340, both the left and right parts of the tick mark are removed if the value of PreferenceFlag variable is set to 3. As can be seen in the image 340, a part 350 of the tick mark attached and overlapping to the component 352 is retained.

As illustrated with reference to FIG. 3-A through FIG. 3-C, a plurality of variables is used in the algorithm for detecting and removing the marks from the acquired image. Such steps may be repeated for each extracted component for detecting and removing the marks. The manner in which mark detection and removal is performed is described below.

In an embodiment, an updated width and updated height of an input component are calculated after correcting the skew angle. This is to facilitate determination of exact position of the points when skew is not provided later.

In this embodiment, if PreferenceFlag=0, OR PreferenceFlag=1, OR PreferenceFlag=3, then the tick mark is identified from right to left. A number of variables such as maximum strip length of tick, minimum tick length, multiple transitions and tick angle are used to detect the tick mark. In case the tick mark is detected, it is erased and the flag IsTickPresentRtoL as is set as TRUE.

In another embodiment, if PreferenceFlag=0 OR PreferenceFlag=1 OR PreferenceFlag=3, then the tick mark is identified from left to right. Various variables such as maximum strip length of tick, minimum tick length, multiple transitions and tick angle are used to detect the tick. In case the tick is detected, it is erased and the flag IsTickPresentLtoR as is set as TRUE.

In a further embodiment, if it is detected that variables (CharPreservation=FALSE) or (PreferencesFlag=0) and (IsTickPresentRtoL is TRUE) and (IsTickPresentLtoR is FALSE), then the remaining section of the tick is removed. Further, if the value of the variable IsTickPresentRtoL is TRUE or the value of the variable IsTickPresentLtoR is TRUE, then the value of the variable IsTickPresent is set as TRUE, else the value of the variable IsTickPresent is set as FALSE.

In another example, if the value of the variable IsTickPresent is TRUE, then the image component is trimmed or removed. In this embodiment, further LogicalSubtractionOfImages and LogicalOROfSmearedImages or both are used to erase the tick component dib and segment the blank image and paste it at that particular location.

FIG. 4 illustrates example screenshots 400 of actual images and mark removed images, according to the aspects of the present technique. In the illustrated embodiment, the original images are represented by reference numerals 402 through 412. The output images obtained after detecting and removing the marks such as tick marks and cross marks are represented by reference numerals 414 through 424. In one example, as shown in an image 402, two tick marks 432 and 434, once detected are removed based on various variables. In one embodiment, the components (line items) are connected with each other due to the presence of tick marks. As shown in image 414, a section/part 436 of the mark (tick mark) 432 attached to "2" seems to be a component which needs to be preserved. In this case only a specific section of the tick mark is removed. However, the other tick mark 434 is completely removed.

In another example, as shown in an original image 404, one mark 442 is detected as a tick mark and is completely removed while the other vertical line 440 is not detected as a tick mark or a cross mark and is retained. Further, as shown in subsequent images, the tick marks that are not attached to a component, are removed completely while the marks attached with the components are retained at the overlapping sections. As can be seen, the output images are clean and may be utilized for accurate pattern recognition and effective data extraction.

Figure 5:
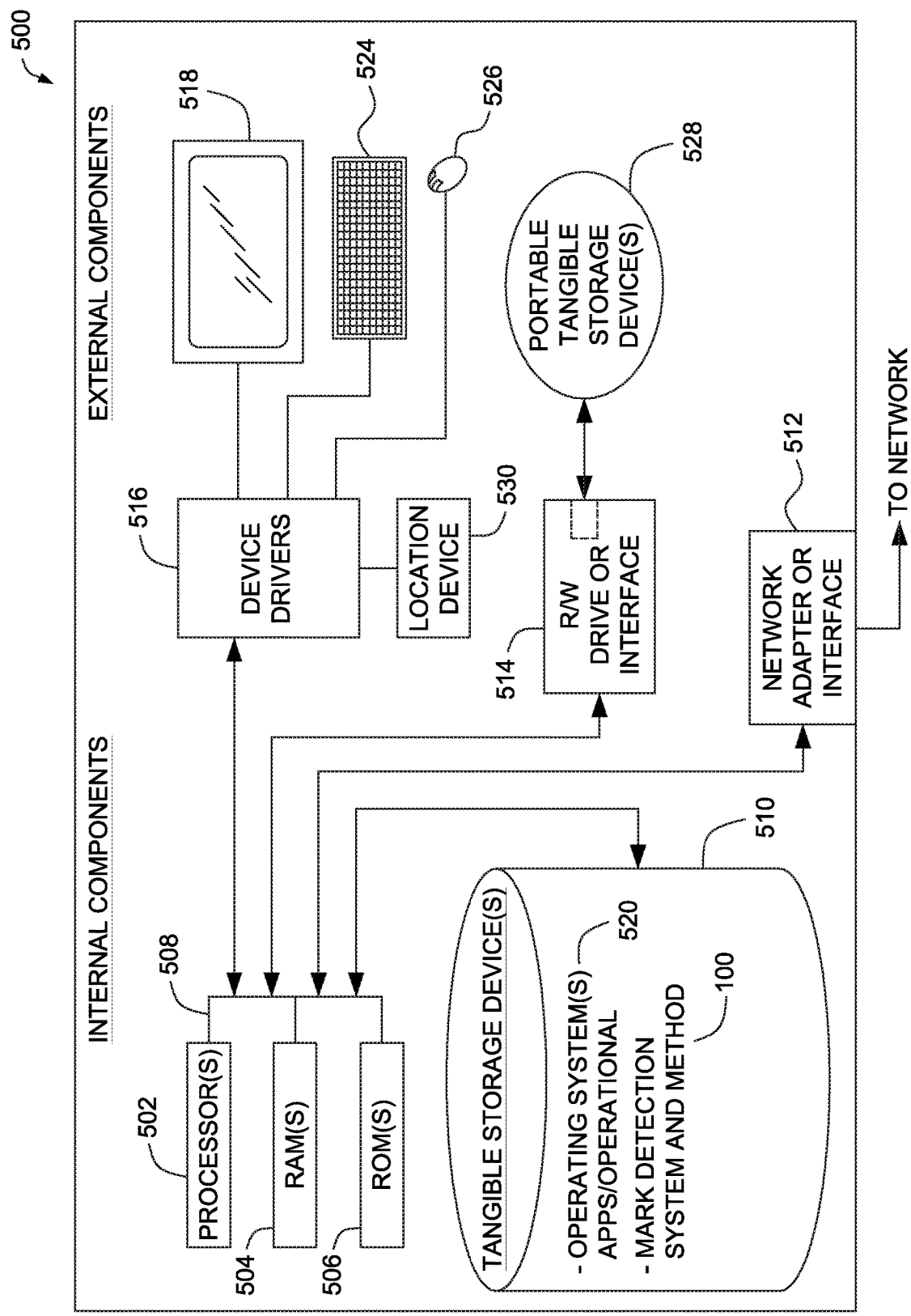
FIG. 5 is a block diagram of an embodiment of a computing device in which the modules of the mark detection system, described herein, are implemented.

The modules of the mark detection system 100 described herein are implemented in computing devices. One example of a computing device 500 is described below in FIG. 5. The computing device includes one or more processor 502, one or more computer-readable RAMs 504 and one or more computer-readable ROMs 506 on one or more buses 508.

Further, computing device 500 includes a tangible storage device 510 that may be used to execute operating systems 520 and the mark detection system 100. The various modules of the mark detection system 100 including an image acquisition unit 102, an image processor 104, a memory 106 and an output module 108. Both, the operating system 520 and the system 100 are executed by processor 502 via one or more respective RAMs 504 (which typically include cache memory). The execution of the operating system 520 and/or the system 100 by the processor 502, configures the processor 502 as a special purpose processor configured to carry out the functionalities of the operation system 520 and/or mark detection system 100, as described above.

Examples of storage devices 510 include semiconductor storage devices such as ROM 506, EPROM, flash memory or any other computer-readable tangible storage device that may store a computer program and digital information.

Computing device also includes a R/W drive or interface 514 to read from and write to one or more portable computer-readable tangible storage devices 528 such as a CD-ROM, DVD, memory stick or semiconductor storage device. Further, network adapters or interfaces 512 such as a TCP/IP adapter cards, wireless Wi-Fi interface cards, or 3G or 4G wireless interface cards or other wired or wireless communication links are also included in computing device.

In one example embodiment, the mark detection system 100 which includes an image acquisition unit 102, an image processor 104, a memory 106 and an output module 108, may be stored in tangible storage device 510 and may be downloaded from an external computer via a network (for example, the Internet, a local area network or other, wide area network) and network adapter or interface 512.

Computing device further includes device drivers 516 to interface with input and output devices. The input and output devices may include a computer display monitor 518, a keyboard 524, a keypad, a touch screen, a computer mouse 526, and/or some other suitable input device.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The invention claimed is:

1. A mark detection system, the system comprising:
   a memory having computer-readable instructions stored therein; and
   an image processor configured to execute the computer-readable instructions to:
   access an image of a document;
   process the image to generate a binarized image,
   extract components of the binarized image;
   analyze features of the extracted components to detect one or more marks in the document;
   detect a portion of a component connected to the one or more detected marks;
   remove the portion of a component connected to the detected one or more marks based upon a value of a preservation variable;
   detect at least portion of a component overlapping with the one or more detected marks; and
   selectively remove portions of the one or more detected marks based upon a value of a preferences variable, wherein the values of each of the preservation and the preferences variable are selected by a user of the system.

2. The mark detection system of claim 1, wherein the image processor is further configured to execute the computer-readable instructions to selectively remove one or more marks based upon the features of the extracted components.

3. The mark detection system of claim 1, wherein the marks comprise tick marks, cross marks, or combinations thereof.

4. The mark detection system of claim 1, further comprising a digital imager configured to acquire a digital image of the document as the image of the document.

5. The mark detection system of claim 1, wherein the image processor is further configured to extract the components of the binarized image using a connected-component labelling algorithm.

6. The mark detection system of claim 5, wherein the image processor is further configured to execute the computer-readable instructions to:
  remove noise components in the binarized image using the connected-component algorithm;
  remove one or more horizontal and/or vertical lines present in the image; and
  detect a skew angle of the image.

7. The mark detection system of claim 1, wherein the image processor is further configured to execute the computer-readable instructions to extract the components of the binarized image using an eight-neighbor connected-component labelling algorithm.

8. The mark detection system of claim 1, wherein the features of the extracted components comprise length, stroke width, angle with respect to a pre-determined axis, trend of pixel transitions, or combinations thereof.

9. The mark detection system of claim 8, wherein the image processor is further configured to execute the computer-readable instructions to adjust the one or more features of the extracted components based on the detected skew angle.

10. A method for removing marks in a document, the method comprising:
  accessing an image of the document;
  processing the image to generate a binarized image of the document;
  extracting components of the binarized image using a connected-component labelling algorithm;
  analyzing features of the extracted components to detect one or more marks in the document; and
  selectively removing the detected one or more marks in the document;
  detecting a portion of a component connected to the one or more detected marks;
  removing the portion of a component connected to the detected one or more marks based upon a value of a preservation variable;
  detecting at least portion of a component overlapping with the one or more detected marks; and
selectively remove portions of the one or more detected marks based upon a value of a preferences variable, wherein the values of each of the preservation and the preferences variable are selected by a user of the system.

11. The method of claim 10, further comprising removing noise components from the binarized image using the connected-component labelling algorithm.

12. The method of claim 10, wherein selectively removing the one or more marks comprises removing one or more of tick marks, cross marks, or combinations thereof.

13. The method of claim 10, wherein selectively removing the detected one or more marks comprising:
  accessing values of a preservation variable and a preferences variable;
  detecting portions of components connected to or overlapping with the detected one or more marks; and
  removing portions of the one or more marks based upon the values of the preservation and the preferences variables.

14. A mark detection system, the system comprising:
  a memory having computer-readable instructions stored therein; and
  an image processor configured to execute the computer-readable instructions to:
    access an image of a document;
    process the image to generate a binarized image,
    extract components of the binarized image using a connected-component labelling algorithm;
    analyze features of the extracted components to detect one or more marks in the document;
    remove portions of the one or more detected marks from the document;
    detect a portion of a component connected to the one or more detected marks;
    remove the portion of a component connected to the detected one or more marks based upon a value of a preservation variable;
    detect at least portion of a component overlapping with the one or more detected marks; and
    selectively remove portions of the one or more detected marks based upon a value of a preferences variable, wherein the values of each of the preservation and the preferences variable are selected by a user of the system.

15. The mark detection system of claim 14, further comprising a digital imager configured to acquire a digital image of the document as the image of the document.

16. The mark detection system of claim 14, wherein the image processor is configured to execute the computer-readable instructions to remove portions of the one or more detected marks based upon the values of preservation and the preferences variables.

17. The mark detection system of claim 14, wherein the image processor is configured to execute the computer-readable instructions to extract one or more line items from the document.

* * * * *